Figure 6:
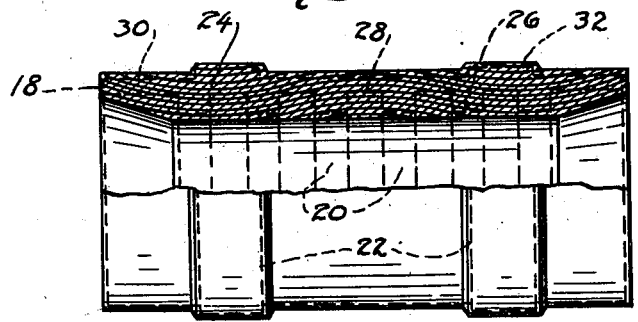

Dec. 31, 1935.  J. A. ROSMAIT  2,025,830
LAMINATED BEARING AND THE METHOD OF MANUFACTURING SAME
Filed Nov. 23, 1933  2 Sheets-Sheet 1
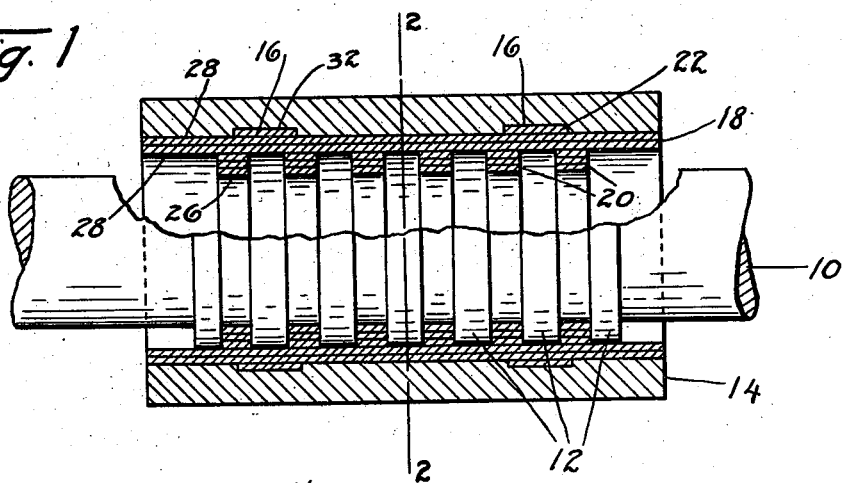
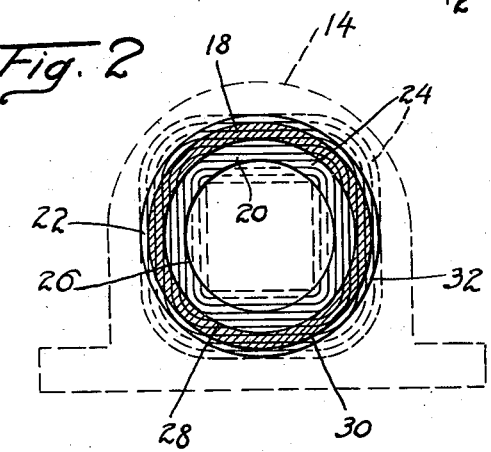
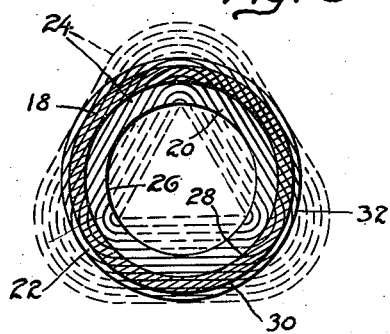
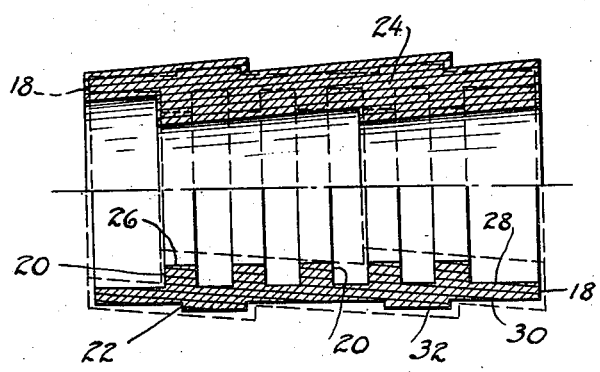
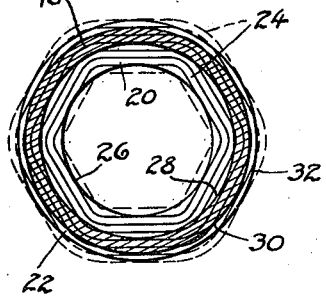
INVENTOR.
John A. Rosmait
BY
ATTORNEYS.

Dec. 31, 1935. J. A. ROSMAIT 2,025,830
LAMINATED BEARING AND THE METHOD OF MANUFACTURING SAME
Filed Nov. 23, 1933 2 Sheets—Sheet 2

INVENTOR.
John A. Rosmait
BY
ATTORNEYS.

Patented Dec. 31, 1935

2,025,830

UNITED STATES PATENT OFFICE 2,025,830

LAMINATED BEARING AND THE METHOD OF MANUFACTURING SAME

John A. Rosmait, Manistee, Mich.

Application November 23, 1933, Serial No. 699,383

8 Claims. (Cl. 154—2)

My invention relates to improvements in laminated bearings and improvements in the method of manufacturing such bearings.

Bearings have heretofore been manufactured comprising a plurality of laminations of fibrous material secured together by a suitable binder and certain of these bearings are long wearing and require little attention.

An object of my invention is to provide such a bearing so constructed as to possess pronounced resistance to thrust axially of the bearing or along a line concentric to the axis of the bearing. My improved bearing is so fabricated that it will resist axial thrust without shearing or telescoping of one lamination with respect to another lamination.

An improved feature is that the fabric laminations, which are secured together by the binder to form the bearing, are so relatively disposed that any thrust concentric to the axis of the bearing is distributed over a plurality of laminations and a plurality of such laminations extend across said line of thrust.

It has been common commercial practice heretofore to build up such a bearing of a plurality of concentric laminations of woven fabric impregnated with and held together by a suitable binding agent. Such bearings were frequently formed and intended to receive a thrust directed along a plane concentric to the axis of the bearing. This thrust might be taken by a portion of the bearing including a plurality of concentric laminations. The thrust would, however, be taken by said given plurality of laminations throughout the entire circumferential extent of the thrust. It would therefore be resisted only by the binding agent disposed between the outermost lamination subject to thrust and the innermost lamination immediately outside of the line of thrust. This resulted in such thrust tending to urge one lamination to telescope with respect to another lamination.

My invention is directed to the fabrication of a bearing in such a manner as to effectually eliminate this tendency. In my improved bearing the laminations are so arranged that a plurality of laminations extend across the thrust line and such thrust is resisted by a plurality of laminations. The axial thrust at one point in the circumference of the bearing is taken by said laminations and at other points within the circumference of the bearing other laminations take such thrust.

Figure 7:
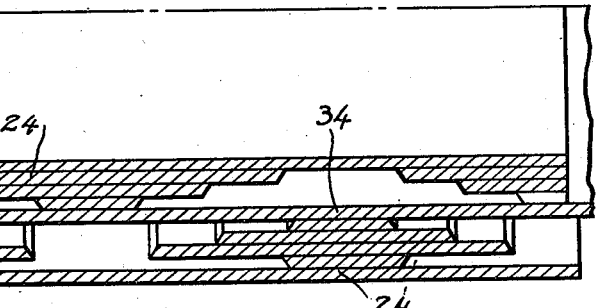
Figure 8:
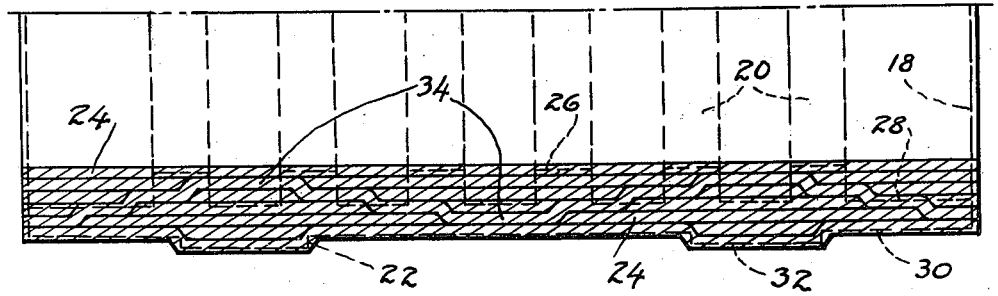

Other objects, advantages, and important features of my invention will more fully appear from the following description, appended claims, and accompanying drawings, wherein:

Figure 1 is an elevation partly in section through a shaft mounted within a laminated bearing of the general type to which my invention belongs, Figure 2 is a cross sectional view taken on the line 2—2 of Figure 1 but showing a bearing illustrating my invention, Figure 3 is a cross section view taken on the same line showing a modified form of my invention, Figure 4 is a cross sectional view taken on the same line showing a second modified form of my invention, Figure 5 is a longitudinal sectional view through a bearing illustrating one modified form of my invention, Figure 6 is a longitudinal sectional view through a bearing illustrating another modified form of my invention, and Figures 7 and 8 are longitudinal sectional views illustrating a different modified form of my invention.

My improvement pertains to that particular general type of bearings wherein a bearing is built up of a plurality of laminations generally arranged concentric with respect to the axis of the proposed bearing and held together by a suitable binder. The operation includes impregnating the laminations, which are commonly of woven fabric, with a suitable resinous substance, of which many are well known, and then subjecting the assembly to heat and pressure to so compact the several laminations as to produce a strong, sturdy, and rigid structure. These bearings are widely used and for many uses the engineering community is favorably disposed with respect to them. My invention pertains to this type of bearing and to improvements therein which will render it resistant to end thrust directed axially or along a circular plane concentric to the axis of the bearing.

It is apparent that if the laminations are arranged concentric to the axis of the bearing, as is common practice and as is illustrated in Figure 1, and if the bearing is constructed of the character similar to that in Figure 1 where there is end thrust to be taken, this end thrust will be directed against portions or laminations which will tend to cause these laminations to telescope with respect to other laminations. My invention is designed to prevent this tendency.

In the construction shown in Figure 1 there is a shaft 10 which is provided with a succession of spaced apart shoulders 12. There is a support or frame member 14 which is provided with spaced apart circumferential grooves 16. There is a bearing indicated in assembly as 18. This bearing is provided with internal circumferential thrust taking shoulders 20 which are arranged to correspond with the spaces between the shoulders 12 on the shaft 10. Exteriorly, this bearing is provided with shoulders 22 adapted to be received within the groove 16 of the frame member 14. It will be noted that this bearing is formed of a plurality of laminations. These laminations are arranged concentric to the axis. They may be of woven fabric held together by a suitable binder. In the drawings the dimension is exaggerated so as to bring out the construction. It is apparent that end thrust would exert a pressure which would tend to urge certain laminations to telescope with respect to other laminations.

In my improved constructions I eliminate this tendency. To accomplish this I propose that the laminations which will form the bearing will be arranged within a body in a manner which is not concentric to the axis of the bearing when completed. A method of accomplishing this is to provide a mandrel which is non-circular in cross section. In Figure 2 the laminations were wound about a square mandrel; in Figure 3 a triangular mandrel; and in Figure 4 a hexagonal mandrel. The laminations thus wound having been impregnated with a suitable binder—various resinous compounds are suitable, or material such as bakelite may be used,—are subjected to further known steps in the process, such as pressure and heat, to form the complete body. It will be found that in this body the laminations 24 are arranged in a manner which will not be concentric to the axis of a cylindrical bearing.

Upon the completion of this body structure it is then cut away in a suitable manner to the proper size to form a cylindrical bearing. This cutting away removes material from both the exterior and interior of the body structure. In Figures 2, 3, and 4 the material of the laminations which is to be removed is shown in dotted outline. The solid lines show the laminations as they remain in the binder in the bearing body after it has been cut down to the proper form. It will be noted that these laminations do not extend concentrically with respect to the axis of the bearing.

The several solid circular lines 26, 28, 30, and 32 in Figures 2, 3, and 4 indicate respectively the inner circumference of the shoulders 20, the inner circumference of the bearing proper, the outer circumference of the bearing proper, and the outer circumference of the shoulder 22.

In Figure 5 I have shown a bearing body wherein the lower half is shown as it would appear with the bearing completed with the excess portions removed but indicated in dotted outline, and the upper half shows the bearing body as it would appear before the cutting operation. This bearing is wound in a conical fashion. In the upper half the completed form of the bearing is shown in dotted outline.

In Figure 6 another modified form is shown wherein it will appear that the laminations have been wound about the axis in a wave-like manner. The dotted outline in the upper half of the drawings shows the completed form of the bearing.

In Figure 7 a series of laminations are illustrated which are of different widths. These may be arranged as shown in Figure 7 and under compression in a semi-circular form. They would take the position shown in Figure 8. In such figure it will be noted that the lamination 34 would be so folded as to extend through the major portion of the diameter of the bearing, lapping over the ends of the more narrow laminations.

In order to utilize a bearing of the type shown in Figure 1 in conjunction with a shaft and frame member of the character illustrated, it would be necessary that the bearing be formed in halves or sections. The bearing might be made in halves or sections if desired. If this were done it could be formed in a shell which would be so shaped as to give form to one-half of the bearing body. The structure shown in Figures 7 and 8 could probably best be formed in that fashion. The several laminations would be compressed together into the shape determined by the shell and upon removal this half of the bearing body would be cut down to the proper size and shape to constitute one-half of the complete bearing.

It will appear that in the several constructions illustrated the end thrust taking portions of the bearing consist of a plurality of laminations. All these laminations do not lie wholly within the thrust taking portions but certain of them extend from such portions into other portions of the bearing body. The end thrust is therefore not so delivered against certain laminations as to tend to cause them to telescope with respect to other laminations. Certain of the laminations extend across the thrust line.

In Figures 2, 3, and 4 the laminations are arranged eccentric with respect to the axis of the bearing at spaced apart points in the circumference of individual laminations and are spaced unequally from the axis of the bearing. In Figure 5 due to the conical arrangement of the layers or laminations there is a crossing of the line of thrust by said laminations of the body structure and individual laminations are not throughout their entire extent spaced equal distances from the axis of the bearing. The same distribution of thrust is apparent in the construction shown in Figures 6, 7, and 8.

What I claim:
1. That method of fabricating a laminated cylindrical bearing including the placing of laminations of fibrous material about a non-circular mandrel, binding said laminations together in such non-circular form, and cutting such form down to the desired cylindrical shape.

2. That method of fabricating a laminated cylindrical bearing which includes the steps of winding successive laminations of woven fabric about a non-cylindrical mandrel, securing said laminations together by a suitable binder in such non-circular form, and cutting said non-circular form down to the desired cylindrical shape.

3. That method of fabricating a laminated circular bearing which includes the arranging of laminations of fibrous material about a non-circular mandrel, securing said laminations together in such non-circular shape, and reducing said non-circular shape to a circular one.

4. That method of fabricating a laminated bearing having shoulder portions arranged concentric to the axis of the bearing and adapted to take axial thrust which includes the steps of placing said laminations about a non-circular mandrel, compressing and adhesively securing said laminations together in such non-circular shape, and cutting said non-circular shape down to a shape circular in transverse cross section.

5. That method of manufacturing a laminated article which includes winding a fibrous sheet about an irregularly shaped mandrel so as to produce a tubular laminated article of irregular shape, securing such laminations together by a suitable binder, removing the laminated tubular article from the mandrel and removing portions from the inner wall of said tubular laminated article to form an article having an interior of circular cross-section.

6. That method of manfacturing a laminated article to withstand shearing stresses which includes winding a sheet of fibrous material about itself in non-circular layers to form a laminated tube of irregular cross-section, securing said laminations together in such non-circular formation, and cutting said non-circular tube down to a circular tube while maintaining the individual layers in non-circular formation.

7. That method of fabricating a laminated circular article which includes winding a strip of fibrous material about a mandrel of non-circular cross-sections to form a laminated article of like cross-section, compressing and hardening said article into its non-circular formation, and removing portions from said laminated article to shape the same into a desired circular formation while maintaining the laminations in their former non-circular formation.

8. That method of fabricating a laminated article to withstand shearing stresses which includes arranging layers of sheet material one upon another in such a fashion that at least several of the individual layers have a zigzag formation, compressing said layers together to form a hardened laminated article having the aforementioned layer formation, and cutting said laminated article down to a shape circular in cross-section while maintaining said layers in their original zigzag formation.

JOHN A. ROSMAIT.